No. 771,560. PATENTED OCT. 4, 1904.
C. A. MEURELL.
BREAD FORMING MACHINE.
APPLICATION FILED MAY 5, 1904.
NO MODEL.
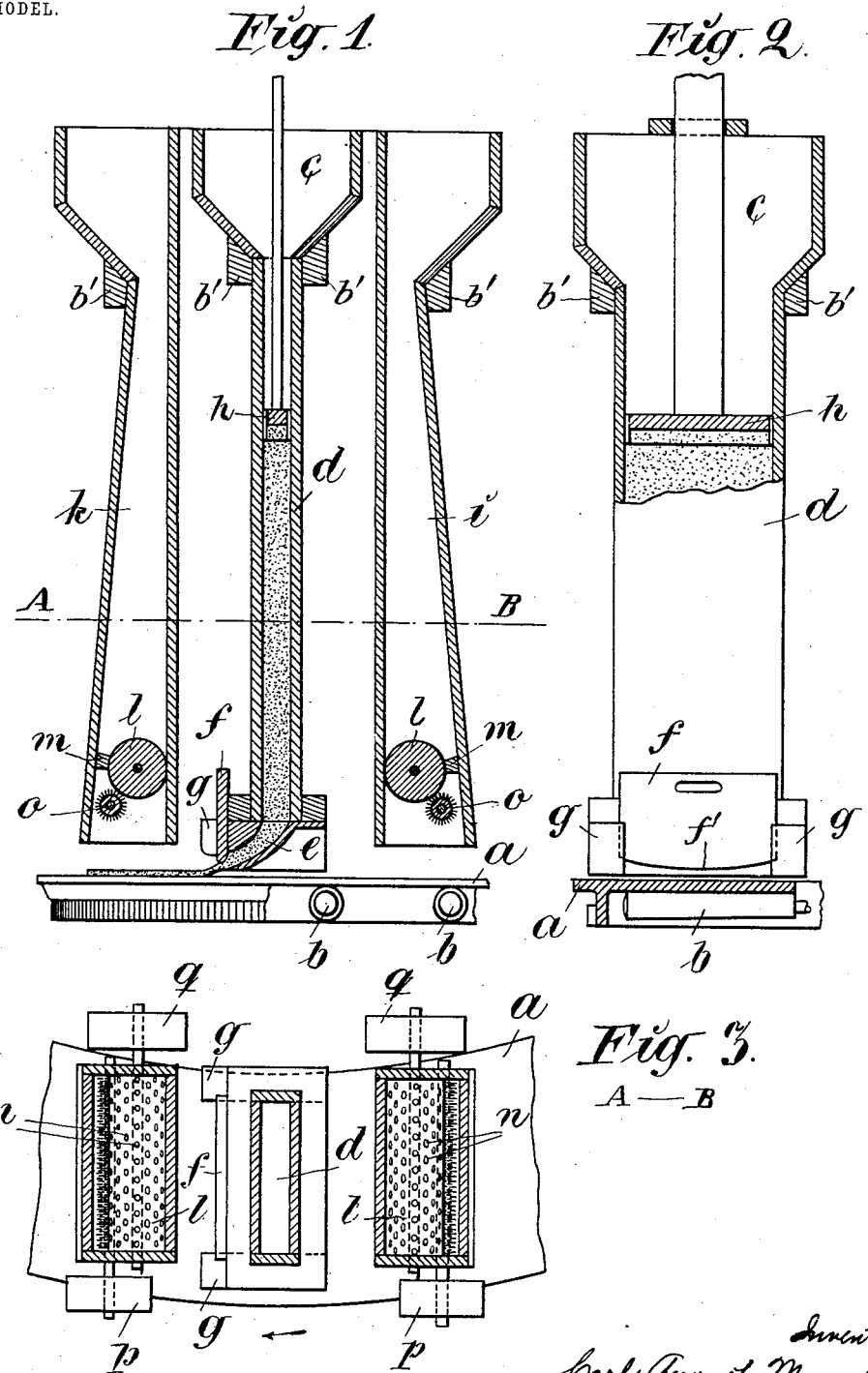

No. 771,560. Patented October 4, 1904.

UNITED STATES PATENT OFFICE.

CARL AUGUST MEURELL, OF SÄTER, SWEDEN.

BREAD-FORMING MACHINE.

SPECIFICATION forming part of Letters Patent No. 771,560, dated October 4, 1904.

Application filed May 5, 1904. Serial No. 206,503. (No model.)

*To all whom it may concern:*

Be it known that I, CARL AUGUST MEURELL, a subject of the King of Sweden and Norway, residing at Säter, Sweden, (whose post-office address is Säter, Sweden,) have invented certain new and useful Improvements in Bread-Forming Machines; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention has relation to a machine designed for use in the manufacture of bread, and more particularly to the manufacture of what is known as "Swedish health bread," which is made in the form of thin cakes, the dough being spread out in a thin layer upon a flour-dusted support and then dusted over with flour, pricked, cut into cakes, the excess of flour previously dusted or scattered thereon removed and baked.

In the manufacture of this particular kind of bread the proportions of water and flour or meal are of importance, as the greater the proportion of water within certain limits the crisper the bread. Hence the dough when made up is comparatively thin and very difficult to roll out into a thin cake of as nearly uniform thickness as possible, and this as well as the other operations above referred to have before my invention been effected by hand, involving a great deal of patient labor and time.

The means for spreading the dough into a thin layer of as nearly a uniform thickness as possible, the means for pricking the layer of dough, and the means for slicing or cutting up said layer into cakes of suitable or desirable size for handling and packing, and even the means for removing the superfluous flour sprinkled on the layer of dough while being spread out may be combined in one machine in bakeries where the output is sufficiently large to admit of the use of a table of sufficient dimensions to provide the necessary space for the application of the various appliances.

Where the output is small, it will be preferable to use separate apparatuses for performing the functions above referred to.

This invention relates more particularly to means for spreading the dough onto a table in a thin layer of substantially uniform thickness and at the same time sprinkling or dusting said layer with flour on both sides for a well-known purpose, the appliances for pricking and cutting the layer of dough and the appliances for removing the superfluous flour sprinkled thereon forming subject-matter for separate applications for patent filed of even date herewith.

I desire it to be understood that I do not limit the use of my invention to the manufacture of bread such as hereinabove referred to, as it is obvious that it may be used for the manufacture of various kinds of baked wares prepared with the flour of cereals.

In the accompanying drawings, Figure 1 is a vertical transverse section of a machine embodying my invention. Fig. 2 is a sectional end view of the dough feeding and distributing device, showing part of the receiving-table also in section; and Fig. 3 is a longitudinal section on the line A B of Fig. 1, the receiving-table being broken away.

As shown in Fig. 3, the receiving-table $a$ is preferably of annular form and is mounted on rollers $b$, supported in any suitable manner, said table having a downwardly-projecting toothed flange, which in practice is geared to a driving-gear, (not shown,) though the table may, if a comparatively small one is used, be rotated by hand. Above the table $a$ are suspended in any suitable manner, as from beams $b'$, the dough feeder and distributer and on either side thereof a flour-receptacle containing means for sprinkling flour onto the table and onto the dough thereon.

The dough feeder and distributer consists of a trunk or hollow column of oblong form in cross-section, its greater diameter being less than the width of the table $a$, and is provided at its lower end with a laterally-projecting delivery-nozzle $e$, whose internal cross-sectional area from the inlet to the outlet is gradually reduced, as shown in Fig. 1, and at the outlet of the nozzle is arranged a valve or gate $f$ for regulating the feed of the dough to the table $a$.

In feeding dough of the kind hereinabove referred to through a channel of oblong form in cross-section I have found that the speed at which the dough flows from the longitudinal center of the nozzle-outlet is greater than at the opposite ends of said outlet, and to avoid this I construct the valve or gate $f$ with a convex cut-off face $f'$, as shown in Fig. 2, so that the area of the outlet of the nozzle is gradually contracted from its opposite ends to the center, as shown in said Fig. 2.

The valve or gate $f$ is arranged to slide in cleats $g$ and may be held in its adjusted position by frictional contact only.

At its upper end the feed-trunk $d$ is enlarged into a dough-receiving hopper $c$, and in practice the trunk $d$ is from about fifteen to twenty times longer than its smaller internal cross-sectional area, so that the weight of the column of dough in the trunk is sufficient to force such dough through the comparatively narrow outlet of the delivery-nozzle $e$ at the desired speed. This is of importance, since it obviates the necessity of supplying large masses of dough to the trunk in order to produce the proper pressure, which would result in overrising of the dough by reason of the time required to form it into thin layers for the oven.

As the dough flows from the nozzle under its own weight, this is gradually reduced, and in order to maintain it under sufficient pressure to cause it to flow from the nozzle at a suitable rate of speed I make use of a piston $h$, by means of which substantially all of the dough remaining in the trunk can be expelled after the weight of the dough becomes insufficient to force it out of the nozzle $e$ at the desired rate of speed.

On either side of the dough-feeder $d$ is arranged a flour-receptacle $k$ and $i$, respectively, whose inlets are hopper-shaped and whose outlets are enlarged laterally, these receptacles being, like the dough-feeder, of oblong form in cross-section, as clearly shown in Fig. 3, and in each receptacle near its outlet is arranged a roller $l$, provided with cup-shaped recesses $n$, said roller rotating in contact with one wall of the receptacle and with a cleat $m$, said wall and cleat forming abutments which prevent the flour above the roller from passing between the roller and the walls of the receptacles, so that only the flour contained in the cups $n$ is carried below the roller, thus regulating the delivery of such flour.

Between each roller $l$ and on the delivery side thereof is arranged a revoluble brush $o$, which scatters the flour. The brush in receptacle $i$ scatters the flour over the table $a$ and the brush in receptacle $k$ scatters the flour over the sheet of dough on said table.

As clearly shown in Fig. 3, the receptacles $i$ and $k$ are also of oblong form in cross-section, their major internal diameter being slightly greater than the like diameter of the trunk $d$, while the minor internal diameter increases gradually from the throat below the feed-hopper thereof to their lower open end to prevent the packing of the flour and facilitate its downward movement to the delivery-rolls $l$, thus avoiding the use of stirring appliances and at the same time providing ample space below said rollers for scattering the flour.

Each of the spindles of the rollers $l$ is provided with a driving-pulley $q$, and each of the spindles of the brushes $o$ is provided with a driving-pulley $p$, which pulleys are driven from any suitable driving mechanism.

It will be observed that one of the flour-receptacles, $i$ or $k$, may be dispensed with, if desired, as flour may be sprinkled on the table $a$ before the gate or valve $f$ is set or before the dough is introduced into the trunk or column $d$, which of course would involve a complete revolution of said table. In bakeries where the output is very large and the table $a$ of considerable diameter this would result in considerable loss of time, and to obviate this I make use of the two receptacles $i$ and $k$ and the flour-sprinkling devices therein, as from their arrangement it will readily be seen that if the table rotates in the direction of arrow, Fig. 2, the distance the table has to travel from receptacle $i$ to nozzle $e$ is very short.

From the description of the construction of the apparatus its operation will be readily understood.

Having thus described my invention, what I claim as new therein, and desire to secure by Letters Patent, is—

1. The combination with an annular rotatable table, of a dough-receptacle above the same and consisting of a vertical hollow trunk of oblong form in cross-section the major internal diameter of which trunk is less than the width of said table, said trunk provided with a delivery-nozzle having a contracted outlet of substantially the same internal diameter as the said major diameter of the trunk, and means acting on the surface of the dough in the trunk to force it through said nozzle, substantially as and for the purpose set forth.

2. The combination of an annular rotatable table, means to feed dough thereto in the form of a sheet of nearly the same width as the table, means to sprinkle flour onto said table and means to simultaneously sprinkle flour onto the sheet of dough fed to the table, for the purpose set forth.

3. The combination with an annular rotatable table and a dough-receptacle consisting of a hollow trunk or column of oblong form in cross-section, the major internal diameter of which trunk is less than the width of said table, said trunk provided with a delivery-nozzle having a contracted outlet of substantially the same internal diameter as the said major diameter of the trunk and arranged transversely of and above the table; of means to sprinkle flour onto said table and onto the sheet of dough formed thereon, for the purpose set forth.

4. The combination with an annular rotatable table and a dough-receptacle consisting of a hollow trunk or column of oblong form in cross-section, the major internal diameter of which trunk is less than the width of said table, said trunk provided with a delivery-nozzle having a contracted outlet of substantially the same internal diameter as the said major diameter of the trunk and arranged transversely of and above the table; of means to sprinkle flour onto said table and means to simultaneously sprinkle flour onto the sheet of dough formed thereon, for the purposes set forth.

5. The combination with an annular rotatable table and a dough-receptacle consisting of a hollow trunk or column of oblong form in cross-section, the major internal diameter of which trunk is less than the width of said table, said trunk provided with a delivery-nozzle having a contracted outlet of substantially the same internal diameter as the said major diameter of the trunk and arranged transversely of and above the table; of a flour-receptacle open at its lower end and provided near said end with means to feed the flour into said end and with means to scatter the flour onto the aforesaid table, for the purpose set forth.

6. The combination with an annular rotatable table and a dough-receptacle consisting of a hollow trunk or column of oblong form in cross-section, the major internal diameter of which trunk is less than the width of said table, said trunk provided with a delivery-nozzle having a contracted outlet of substantially the same internal diameter as the said major diameter of the trunk and arranged transversely of and above the table; of a flour-receptacle on either side of the aforesaid trunk, said receptacles of oblong form in cross-section the major internal diameter of the receptacles being greater than the like diameter of said trunk, each of said receptacles provided in and near their lower open ends with a delivery-roller having peripheral recesses for the flour, said roller revoluble in contact with abutments and a revoluble brush on the delivery side of and below said roller, for the purposes set forth.

7. The combination with an annular revoluble table, means to feed dough thereto in the form of a sheet of a width less than that of said table; of an open-ended flour-receptacle on either side of said dough-feeder, said receptacles of oblong form in cross-section the major diameter of which receptacles being greater than the width of the sheet of dough fed to the table while the minor diameter of said receptacles increases from near their upper to their lower ends, a revoluble feed-roller in each of said receptacles rotating in contact with abutments and having peripheral recesses for the flour, and a rotatable brush on the delivery side of and below each of said rollers, for the purpose set forth.

8. The combination with the delivery-nozzle, $e$, of the dough-feeder; of a gate $f$, having a convex under face, said gate adjustable to regulate the thickness of the sheet of dough issuing from said nozzle, substantially as and for the purposes set forth.

9. The combination with an annular rotatable table, of a dough-receptacle above the same and consisting of a vertical hollow trunk of oblong form in cross-section, the major internal diameter of which trunk is less than the width of said table, said trunk provided with a delivery-nozzle having a contracted outlet of substantially the same internal diameter as the said major diameter of the trunk, and a follower or piston acting on the body of dough in the trunk to force it through the nozzle, substantially as and for the purpose set forth.

10. The combination with an annular rotatable table, of a dough-receptacle above the same and consisting of a vertical hollow trunk of oblong form in cross-section, the major internal diameter of which trunk is less than the width of said table, said trunk provided with a delivery-nozzle having a contracted outlet of substantially the same internal diameter as the said major diameter of the trunk, and a cut-off valve or gate $f$, movable in front of the nozzle-outlet and having a convex cut-off face $f'$, substantially as and for the purposes set forth.

11. The combination with a rotatable table and means to feed dough thereto in the form of a sheet, of a flour-receptacle above the table comprising a hollow open-ended trunk arranged with its lower end close to said table and means in the lower part of the trunk to feed flour to its lower end and means to scatter the flour in said lower end of the trunk, for the purpose set forth.

In testimony that I claim the foregoing as my invention I have signed my name in presence of two subscribing witnesses.

CARL AUGUST MEURELL.

Witnesses:
L. KALLENBERG,
HARRY FR. ALBIHN.